(12) United States Patent
Au

(10) Patent No.: US 7,381,109 B2
(45) Date of Patent: Jun. 3, 2008

(54) WATER CRAFT WITH NEW CONFIGURATION OF ACTIVE HULLS AND STATIONARY HULLS FOR BETTER HYDRODYNAMIC PERFORMANCE, GREATER STABILITY AND INCREASED VERSATILITY

(76) Inventor: Ching Yin Au, P.O. Box 31205, Greenwich, CT (US) 06831-0905

( * ) Notice: Subject to any disclaimer, the term of this patent is extended or adjusted under 35 U.S.C. 154(b) by 0 days.

(21) Appl. No.: 11/654,991

(22) Filed: Jan. 19, 2007

(65) Prior Publication Data

US 2007/0175380 A1    Aug. 2, 2007

Related U.S. Application Data

(60) Provisional application No. 60/762,460, filed on Jan. 27, 2006.

(51) Int. Cl.
*B63H 1/04* (2006.01)
*B63H 5/02* (2006.01)
*B63B 1/00* (2006.01)

(52) U.S. Cl. .......................................... 440/90; 114/58
(58) Field of Classification Search ................. 440/90, 440/113; 114/58, 147, 382
See application file for complete search history.

(56) References Cited

U.S. PATENT DOCUMENTS

| 2,309,875 | A | * | 2/1943 | Thompson | ................. | 440/100 |
| 2,488,310 | A | * | 11/1949 | Mayer | ......................... | 440/100 |
| 5,299,523 | A | * | 4/1994 | Kovacs et al. | ............. | 440/12.7 |

* cited by examiner

*Primary Examiner*—Lars A Olson
*Assistant Examiner*—Daniel V Venne

(57) ABSTRACT

Water craft achieving better hydrodynamic performance, greater stability and increased versatility. The improvement over the water craft in the U.S. Pat. No. 6,595,815 is achieved by the use of a new configuration of the active hulls and the stationary hull, the modification of the active hulls and the stationary hulls and the addition of a pair of the modified active hulls.

2 Claims, 22 Drawing Sheets

WATER CRAFT WITH NEW CONFIGURATION OF ACTIVE HULLS AND STATIONARY HULLS FOR BETTER HYDRODYNAMIC PERFORMANCE, GREATER STABILITY AND INCREASED VERSATILITY

BACKGROUND OF THE INVENTION

This invention relates to an improvement in the performance, the stability and the versatility to the water craft as configured in the U.S. Pat. No. 6,595,815 and relates to the application of U.S. Provisional Patent No. 60/762,460 filed Jan. 27, 2006.

The water craft in the U.S. Pat. No. 6,595,815 is of a trimaran design with a central stationary hull flanked by two rotatively driven active hulls, one on each side. The central hull is of a conventional design and the active hulls are in the shape of a hollow truncated water-tight cone with their axis of rotation positioned approximately forty five degrees relative to the horizontal and projected laterally from the central stationary hull. The active hulls are therefore arranged three-dimentionally to gain the capability of actively diverting water toward the side and the rear for the purpose of drastically reducing frontal and friction drag. The active hulls are equipped with paddles for propulsion. The central stationary hull is designed to have surfaces to recover some of energy wasted by the paddling of the active hulls and the location of the central hull is such that some of the energy of the bow waves generated by the central hull is captured by the paddles of the active hulls to help with their rotation.

It is an object of this invention to improve the hydrodynamic performance, the stability and the versatility of the water craft as configured in the U.S. Pat. No. 6,595,815 by the use of a new configuration of the active hulls and the stationary hull, the modification of the active hulls and the stationary hull and the addition of a pair of the modified active hulls.

SUMMARY OF THE INVENTION

The methods by which the objective described in the previous section can be achieved can be described clearly in the following step-by-step manner:

Step (1): The stationary hull at the center of the water craft in the U.S. Pat. No. 6,595,815 is removed from its location. Two stationary hulls of a different geometry will replace the said removed hull in a different location, as described in Step (4) below.

Step (2): The paddles on the active hulls as in the U.S. Pat. No. 6,595,815 are eliminated.

Step (3): A tandem (in line) pair of identical active hulls is added behind the original pair. The two pairs of active hulls, however, are oriented differently. Instead of having the axis of rotation of each active hull tilted approximately forty-five degrees toward the center of the water craft, the axis of rotation of each active hull of the new water craft is tilted approximately forty-five degrees away from the center. The slanted flat bottoms (the large planar ends) of each pair of the active hulls are now facing each other at the center of the water craft. The two active hulls in each pair of the active hulls are moved laterally as dose to each other as possible. All the changes in this step give the water craft more lateral stability.

Step (4): The leading pair of active hulls is separated from the trailing pair of active hulls by a distance designed to allow room for the placement of a pair of stationary hulls. The new water craft now has a shape that resembles a typical catamaran with two streamline hulls except that, instead of having two integral hulls, the water craft of this invention has two composite hulls, each consists of two rotatively driven active hulls longitudinally separated by a stationary hull which is shaped to incur no frontal drag when the water craft is in motion by having its lateral surfaces shaped to follow the contour of, but without making contact with, the conical surface of its adjacent active hulls and by having its four longitudinal surfaces so arranged that one is a vertically tilted flat surface coplanar with the planar bottom of its adjacent active hulls, one vertical flat surface spanning, but without making contact with, the outermost part of the conical surfaces of its adjacent active hulls, one horizontal flat surface that is the bottom of the stationary hull and one horizontal flat surface that is the top of the stationary hull. The gaps between the stationary hull and the active hulls are made big enough to minimize the frictional drag between the rotating hulls and the stationary hull and for other engineering considerations.

Step (5): Finally, a strong but light supporting structure is added to connect the two stationary hulls and to support the rotatively driven active hulls.

The central stationary hull in the U.S. Pat. No. 6,595,815 is mainly for floatation and the seating of riders, although it is also instrumental in capturing some of the energy lost in water craft's paddling process. The location of the central stationary hull relative to the active hulls is such that some of the bow waves energy generated by the stationary hull is captured by the paddles on the active hulls. However, not all of the bow waves energy is captured and used for propulsion. In Step (1), the removal of the central stationary hull in the U.S. Pat. No. 6,595,815 eliminates the frontal and frictional drags of said removed central stationary hull. The lost floatation due to the removal of said central stationary hull is replaced by the addition of the pair of stationary hulls and the addition of a pair of rotatively driven active hulls as described in Steps (3) and (4). Since said added pair of stationary hulls and said added pair of active hulls incur no frontal drag but incur a frictional drag which is intentionally set equal to the frictional drag of the central stationary hull in the U.S. Pat. No. 6,595,815 by adjusting the length and height of said added pair of stationary hulls. Since the only frontal drag in this invention is incurred by the front pair of rotatively driven active hulls which is similar to the pair of rotatively driven active hulls in U.S. Pat. No. 6,595,815, the elimination of the central stationary hull in this patent essentially achieves a reduction in total drag and, therefore, a better hydrodynamic performance. FIG. 21 and FIG. 22 in the "DETAIL DESCRIPTION OF THE DRAWINGS" section below will demonstrate graphically this improvement in performance.

The water craft in this invention has better lateral stability with a new orientation for the two pairs of rotatively driven active hulls as described in Step (3) and the water craft in this invention has greater versatility due to the following two modifications:

(1) The removal of the paddles on the active hulls as in Step (2) allows the use of any kind of inboard and outboard propulsive devices, even sails.

(2) The change from a trimaran to a catamaran design makes the water craft in this invention marketable in the entire range of sizes. The catamaran design with its four rotatively driven active hulls makes the water craft a better amphibian.

DETAILED DESCRIPTIONS

The following figures serve to illustrate graphically the appearance of the water craft in this invention, the shape and the placement of the stationary hulls and the shape, the placement and the method of motorizing the active hulls. A typical light supporting structure is presented. A water jet propulsion system is chosen. Other propusive devies can be used.

Figure 1:
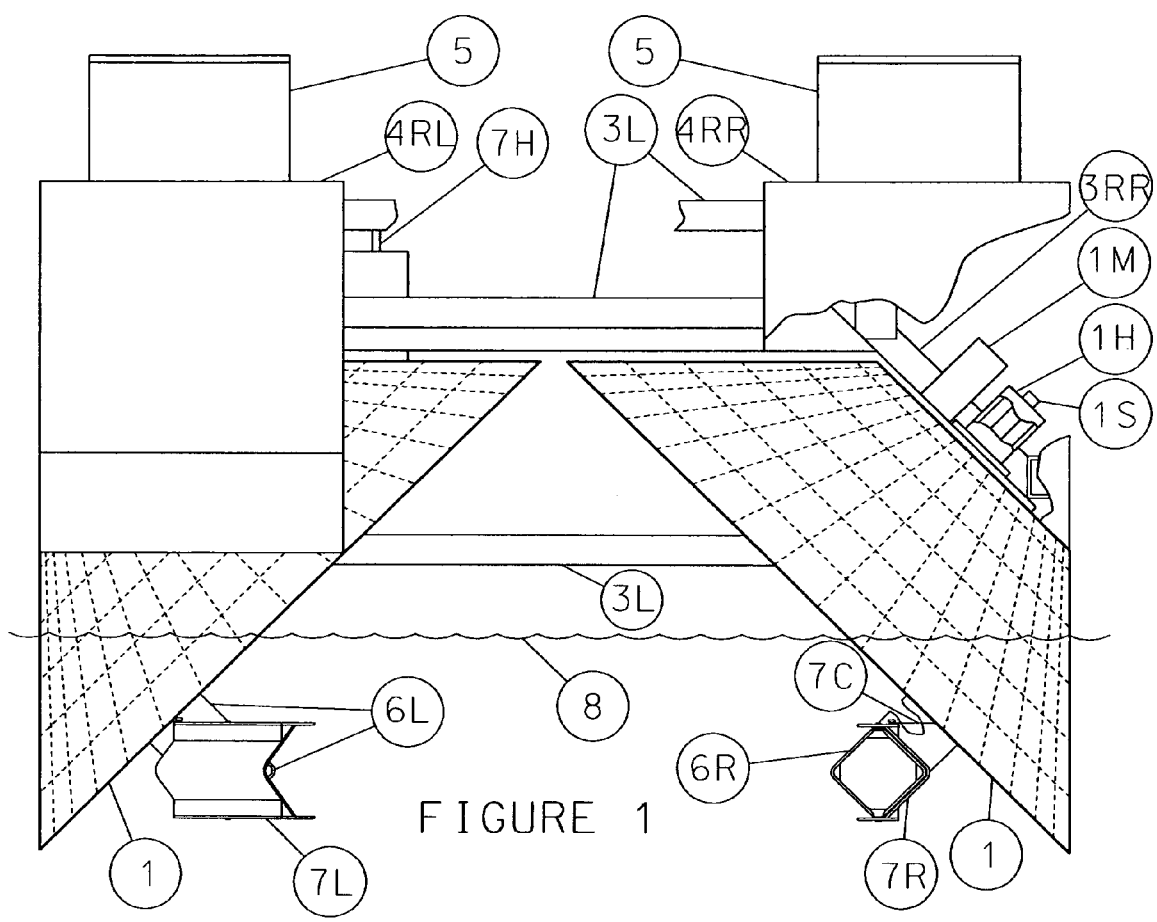
FIG. 1 is a rear view of the water craft.

FIG. 1 is the rear view of the water craft, in which the two 1's are the active hulls. The shape of both active hulls is of a truncated conical configuration with a planar end wall similar to the active hulls in U.S. Pat. No. 6,595,815 with two exceptions: firstly, the conical surface of the active hulls in this patent has no paddle, the dashed lines are placed there to create the appearance of curvature of the conical surface and secondly, in this patent, the central shaft 1S of the active hull is slanted approximately 45 degrees with horizon away from the center of the water craft. The new orientation gives the water craft greater lateral stability. 1H is the upper shaft housing which together with the lower shaft housing (not shown here ) secures the central shaft and allows the active hull to rotate when driven. 1M is the electric motor that drives the active hull with pulleys and belts(not shown here). 3RR is one of the supporting member for the upper and lower shaft housing and electric motor.

4RR and 4RL are the fenders for the right and left active hull respectively that cover the active hulls. Immediately in front of and hidden behind the right and left fender are the right and left stationary hull. Immediately in front of the right and left stationary hull are the front right and left active hull which are hidden in this view. The items identified as 3L's are the lateral members of the main supporting structure. The two items identified as 5's are the two seats. 6R and 6L are respectively the right and left water jet outlet which has its deflector 7R and 7L attached to help with the steering of the water craft 7H is the handle that manipulates the deflectors through cable 7C. 8 indicates the water level.

Figure 2:
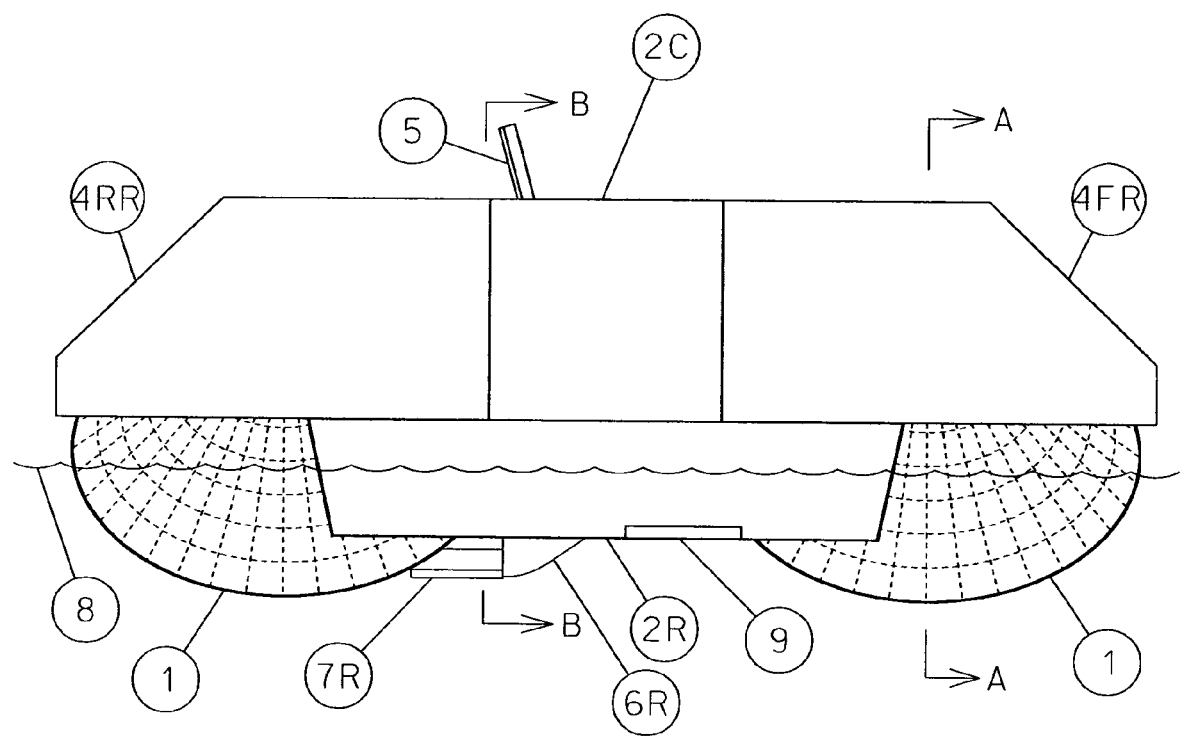
FIG. 2 is a side view of the water craft

FIG. 2 is the side view of the water craft, in which the two items identified as 1's are the two active hulls on the right side of the water craft, one at the front and one at the rear. Between the two active hulls is the stationary hull 2R. 4FR and 4RR are the fenders for the front active hull and the rear active hull respectively. 5 is one of the seats of the water craft and 2C is one of enclosures for the seats. 6R is the right water jet outlet and 7R is its deflector. 8 indicates the water level and 9 indicates the inlet of the water jet.

Figure 3:
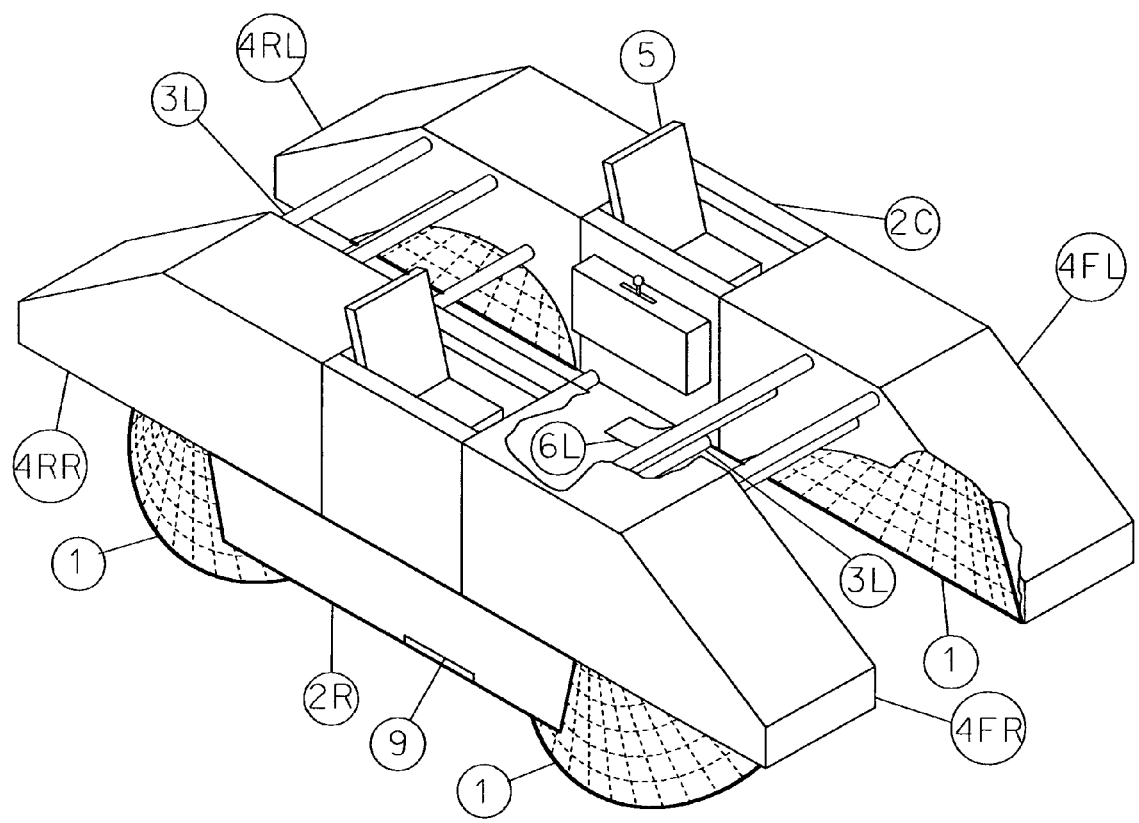
FIG. 3 is an isometric view of the water craft.

FIG. 3 is an isometric view of the water craft, showing all the items described in FIG. 1 and FIG. 2. The only new item in this figure is 4FL which is the front left fender for active hull 1. This fender has a cut-out portion to show the front left active hull more dearly. The rear left active hull is not identified but is shown clearly under the left rear fender 4RL.

Figure 4:
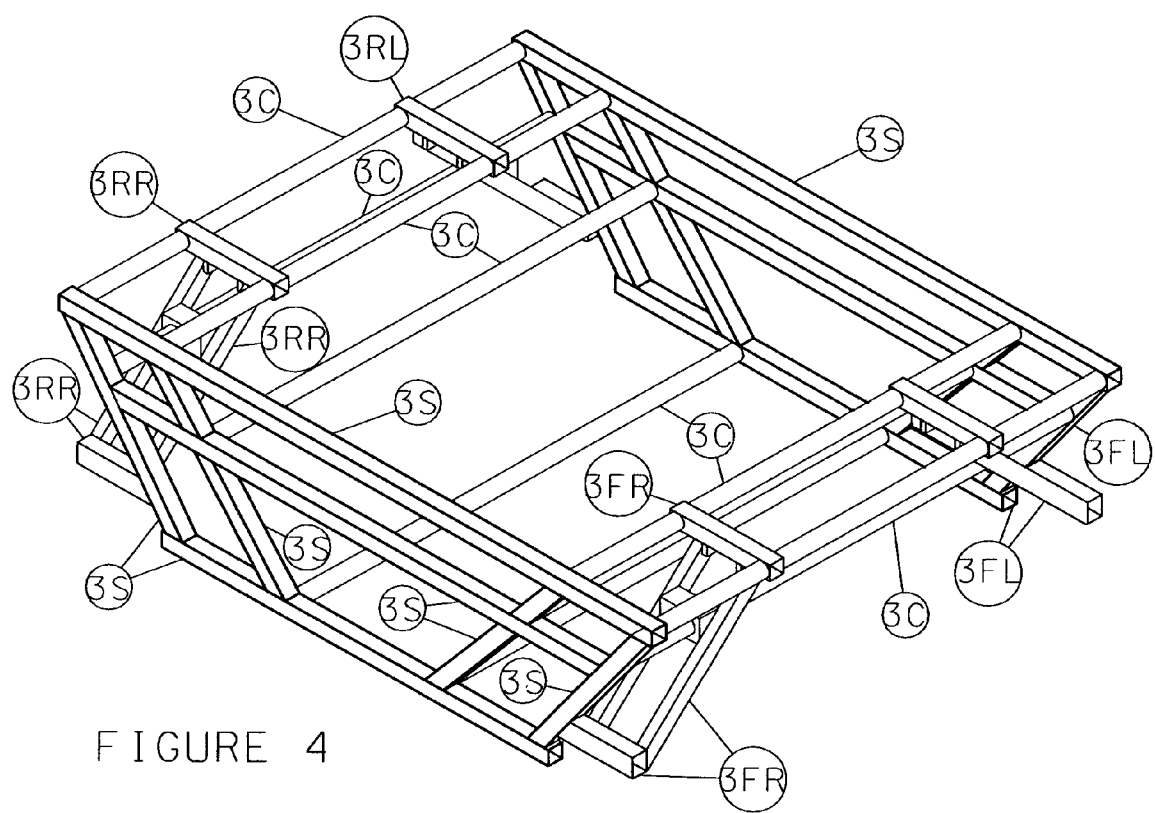
FIG. 4 is an isometric view of the supporting structure of the water craft.

FIG. 4 is an isometric view of the main supporting structure. The two groups of five items each identified as 3C are the lateral beams. The two groups of seven items identified as 3S are the two side trusses. 3RR and 3RL are the right and left supporting members respectively for the rear active hulls. 3FR and 3FL are the right and left supporting members respectively for the front active hulls.

Figure 5:
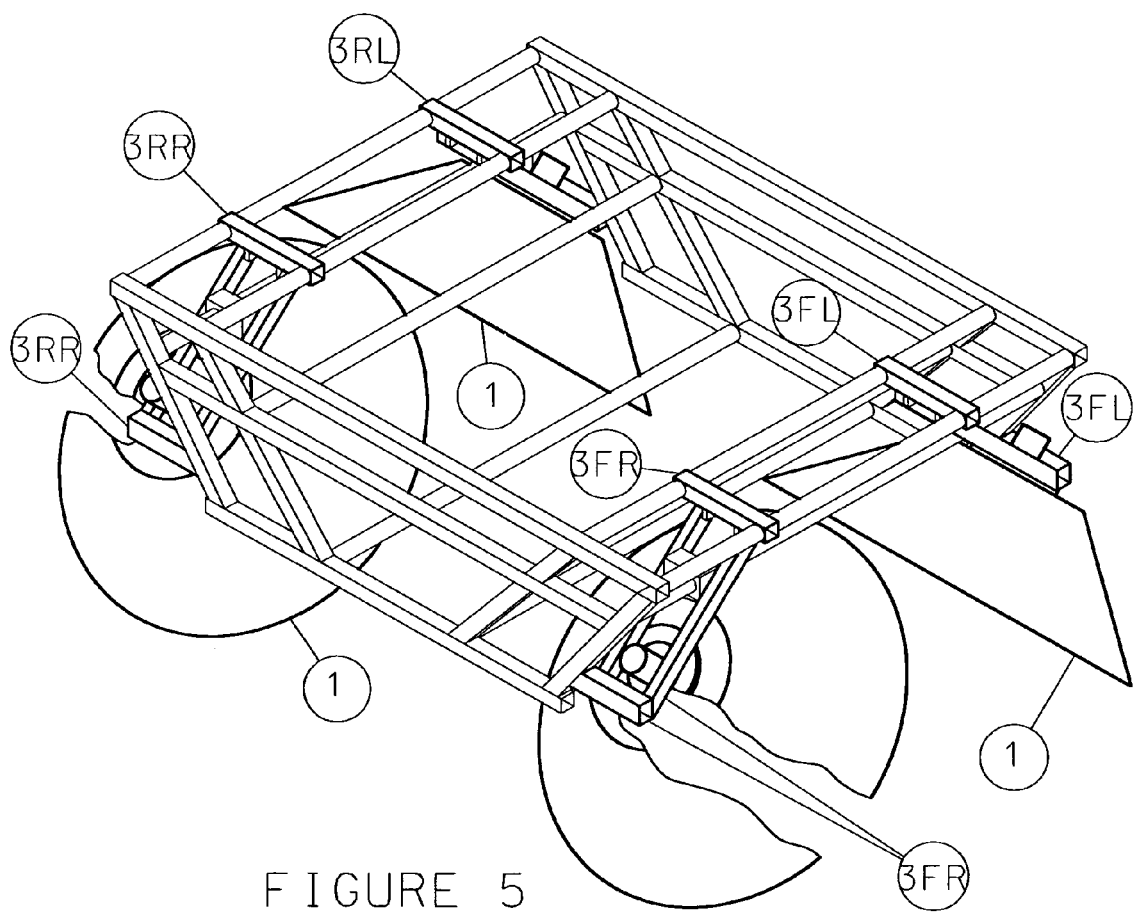
FIG. 5 is an isometric view of the four rotatively driven active hulls attached to the supporting structure.

FIG. 5 is an isometric view of the main supporting structure with the four active hulls installed. Items identified here have been described above.

Figure 6:
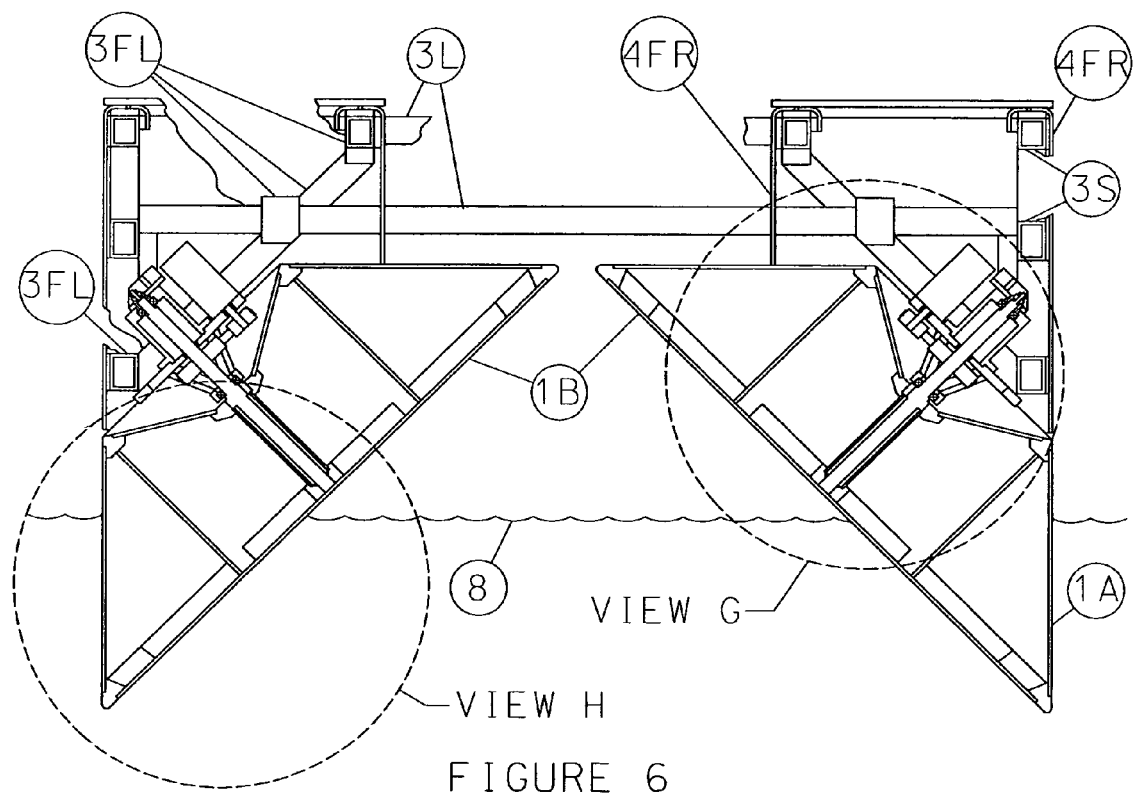
FIG. 6 is Section A-A of FIG. 2, showing the detailed construction of the active hulls and the system that drives them.

FIG. 6 is Section A-A of FIG. 2 in which View G will be shown later independently so that the items there can be identified more clearly and View H will be shown later independently so that the items there can be identified more dearly. 1A shown in this figure is the conical shell of the active hulls and 1B is the flat bottom closure of the conical shell, in the shape of the a flat disk. Other items identified here have been described in FIG. 2 and FIG. 4.

Figure 7:
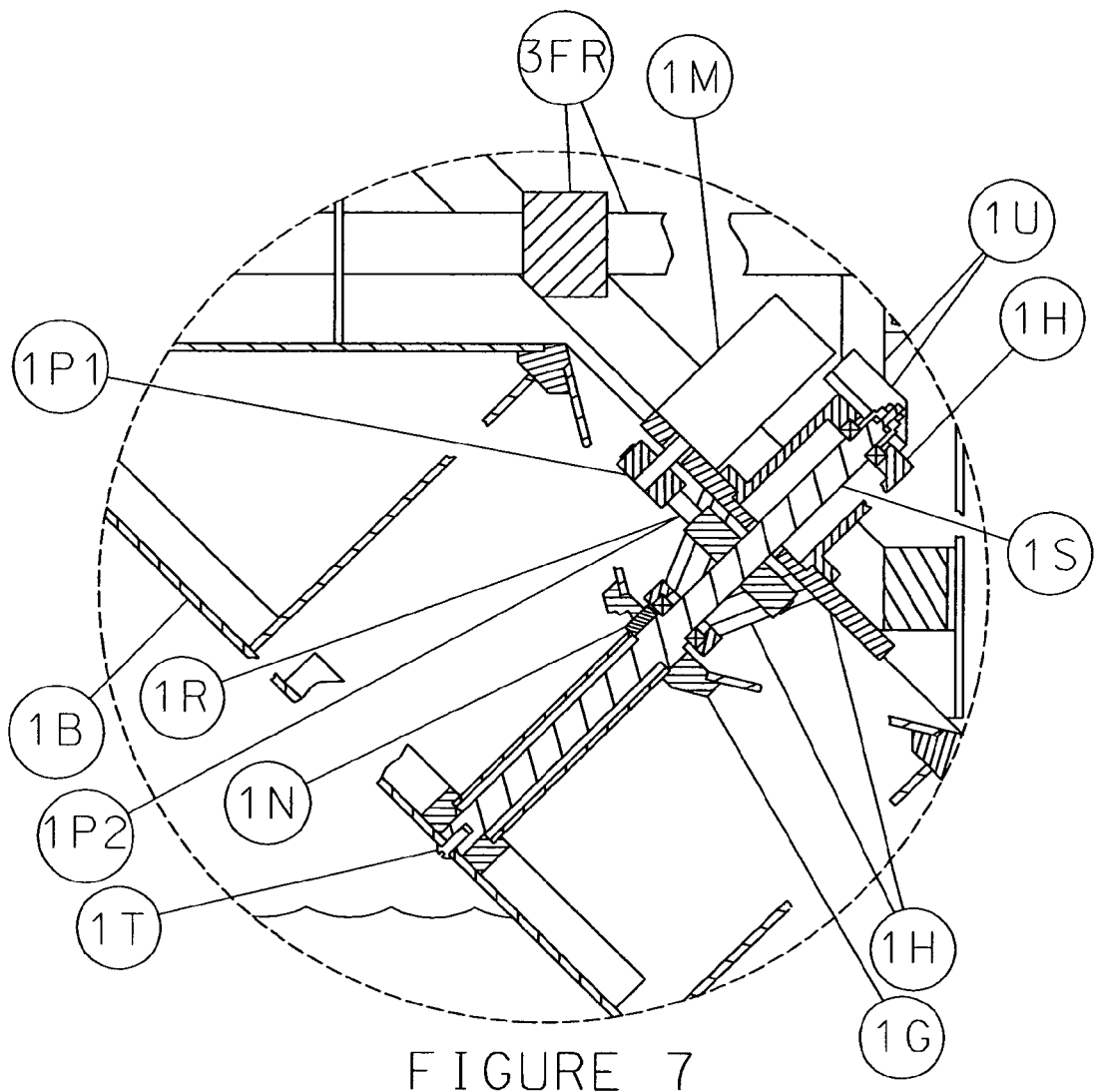
FIG. 7 is View G of FIG. 6, showing the assembly of the central shaft that drives the active hull,the electric motor and the belt drive that connects the central shaft and the electric motor.

FIG. 7 is View G of FIG. 6 which shows that the central shaft 1S is keyed to 1G of the active hull with key 1N for a positive engagement. 1B of the active hull is fastened to 1S with screw 1T. 1S is secured to its housing 1H with bearings to allow for rotation. The bottom plate of 1H is fastened to the supporting structure members 3FR and the top of 1H is further secured with additional bracing members 1U. An electric motor 1M drives the central shaft 1S through pulleys 1P1 and 1P2 and belt 1R.

Figure 8:
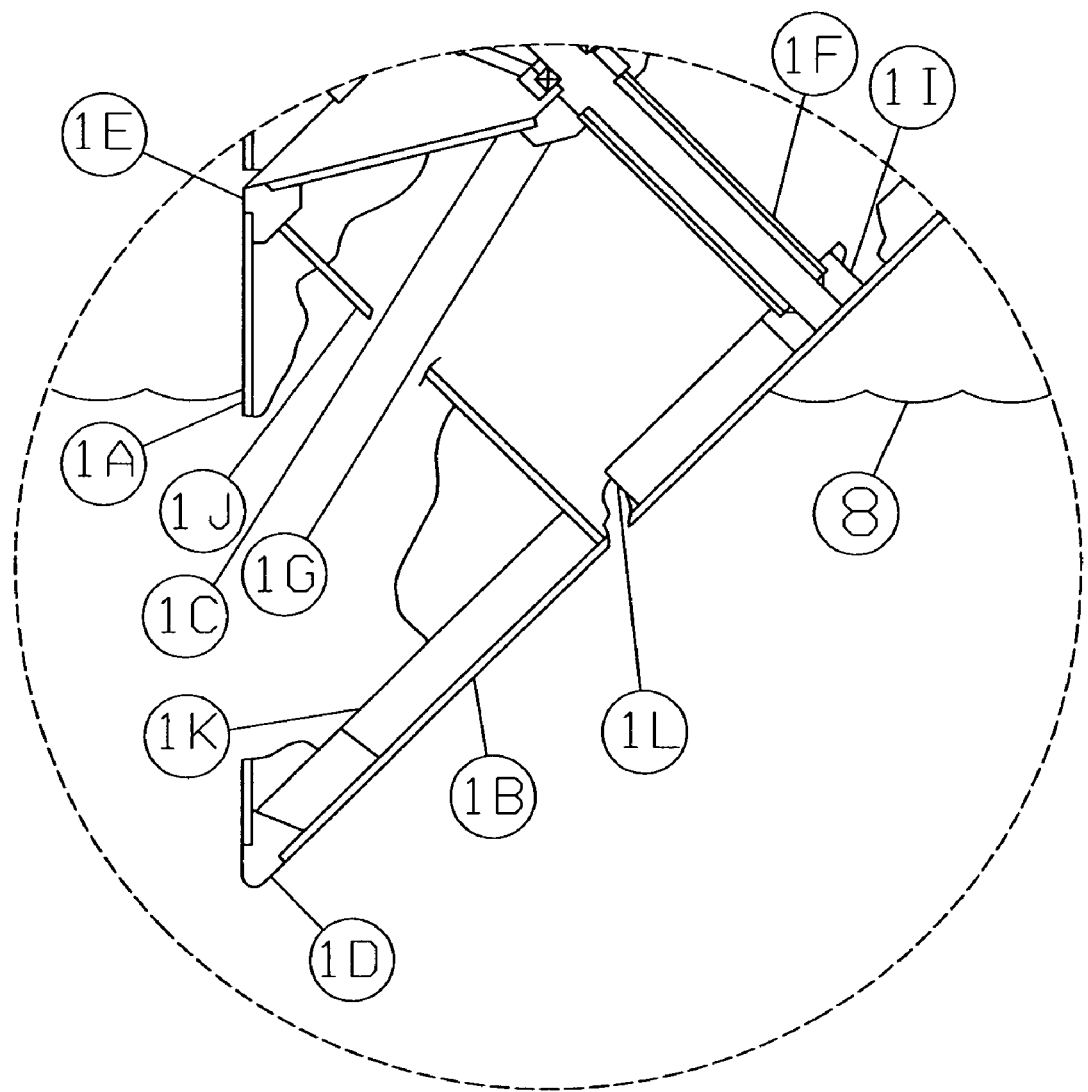
FIG. 8 is View H of FIG. 6, showing the detailed construction of one of the rotatively driven active hulls.

FIG. 8 is View H of FIG. 6 which shows the detailed construction of the active hull of this invention. 1A is the conical shell, 1B is the flat bottom closure of the conical shell and 1C is the conical top closure of the conical shell. 1F is a thin walled tubing that provides an annular space at the center of the active hull. 1D is a ring shaped member designed to join 1A to 1B. 1E is a ring shaped member designed to join 1A to 1C. 1G is a ring shaped member designed to join 1C to 1F. 1I is a ring shaped member designed to join 1F to 1B. 1J is a cylindrical shell for the stiffening of 1B. 1K and 1L are flat plates for the further stiffening of 1B. The interior of the conical active hull thus formed is further reinforced with dosed cell plastic foam.

Figure 9:
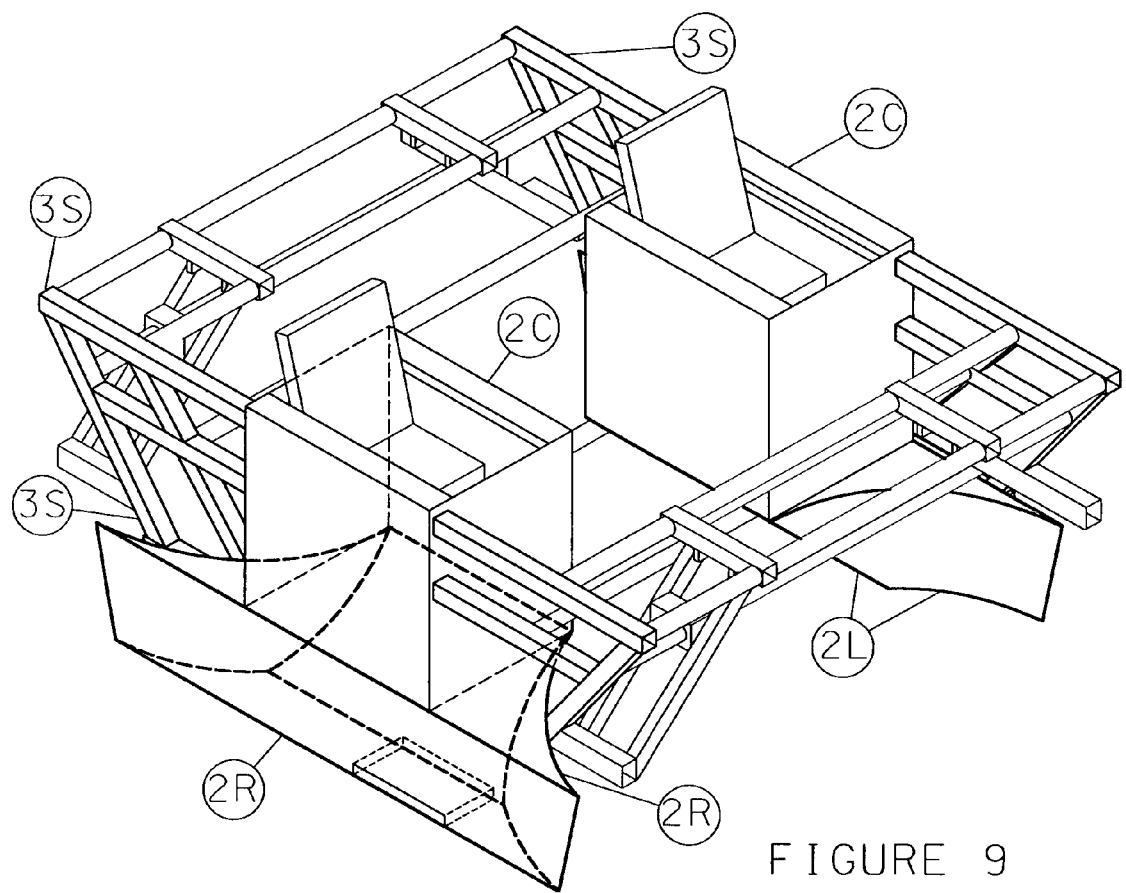
FIG. 9 is an isometric view of the two stationary hulls attached to the supporting structure.

FIG. 9 is an isometric view of the right and left stationary hull, 2R and 2L, installed on the supporting structure 3S. Other items identified here have been described above.

Figure 10:
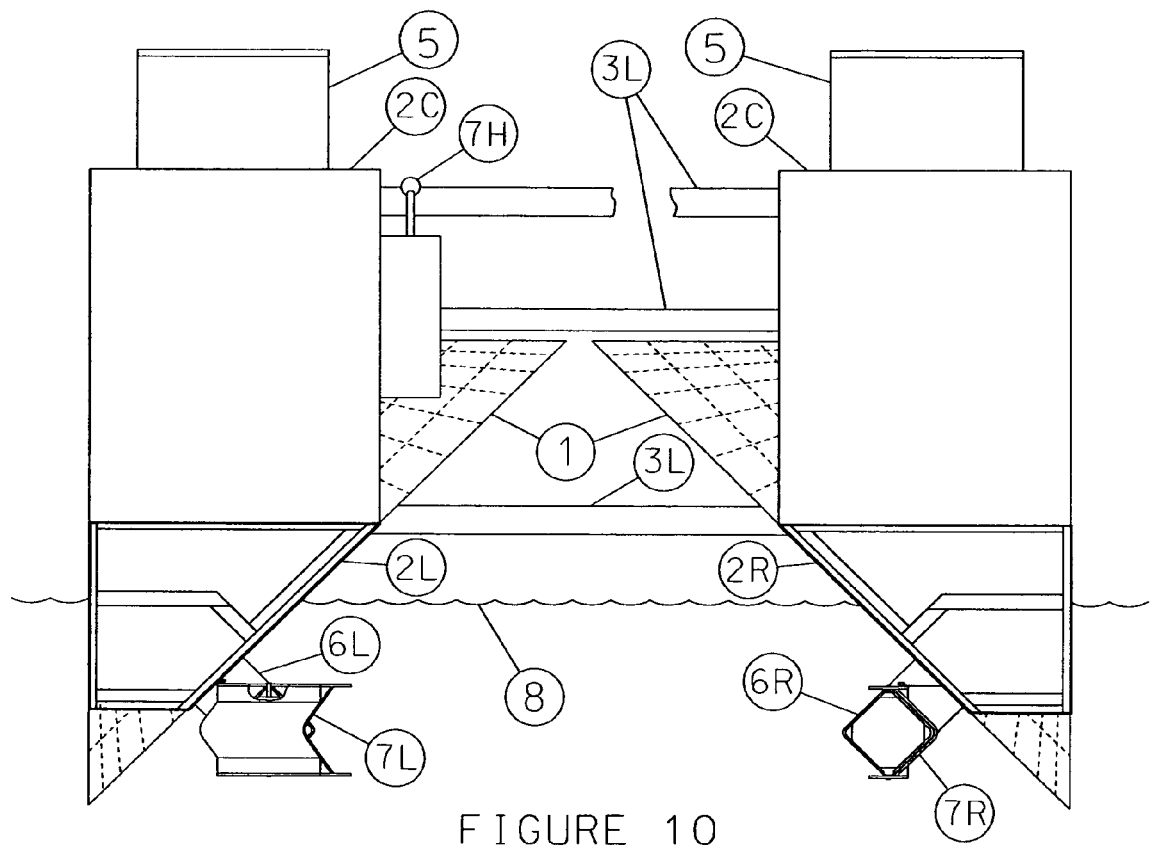
FIG. 10 is Section B-B of FIG. 2, showing the shape of the two stationary hulls.

FIG. 10 is Section B-B of FIG. 2. This figure together with FIG. 9 shows the location and shape of the two stationary hulls. The right stationary hull 2R, for example, is directly behind the right front active hull 1. The frontal and rear surface of 2R wrap around the conical surface of 1's with adequate clearance to minimize the frictional drag encountered by the rotating conical surface. The left slanted side wall of 2R is coplanar with the planar bottom surface of the active hull in front and the right vertical side wall of 2R, as seen in this figure, lines up with the vertical outline of the active hull in front. When the water craft is moving, water flows passed the active hull and then passed the stationary hull smoothly without imposing any frontal drag on the stationary hull. The placement and shape of the stationary hull thus enable it to accommodate a rider, to gain additional floatation and to accommodate an inboard water jet or other propulsive devices without incurring any frontal drag. The rear right active hull(not shown in this figure) is directly behind the right stationary hull 2R. The same reasoning of the absence of frontal drag for stationary hull 2R applies to the rear right active hull. Other items identified here have been described above.

It should be noted that the water jet components normally appear in the stationary hull are not shown here in order to show the shape of the stationary hull more clearly.

Figure 11:
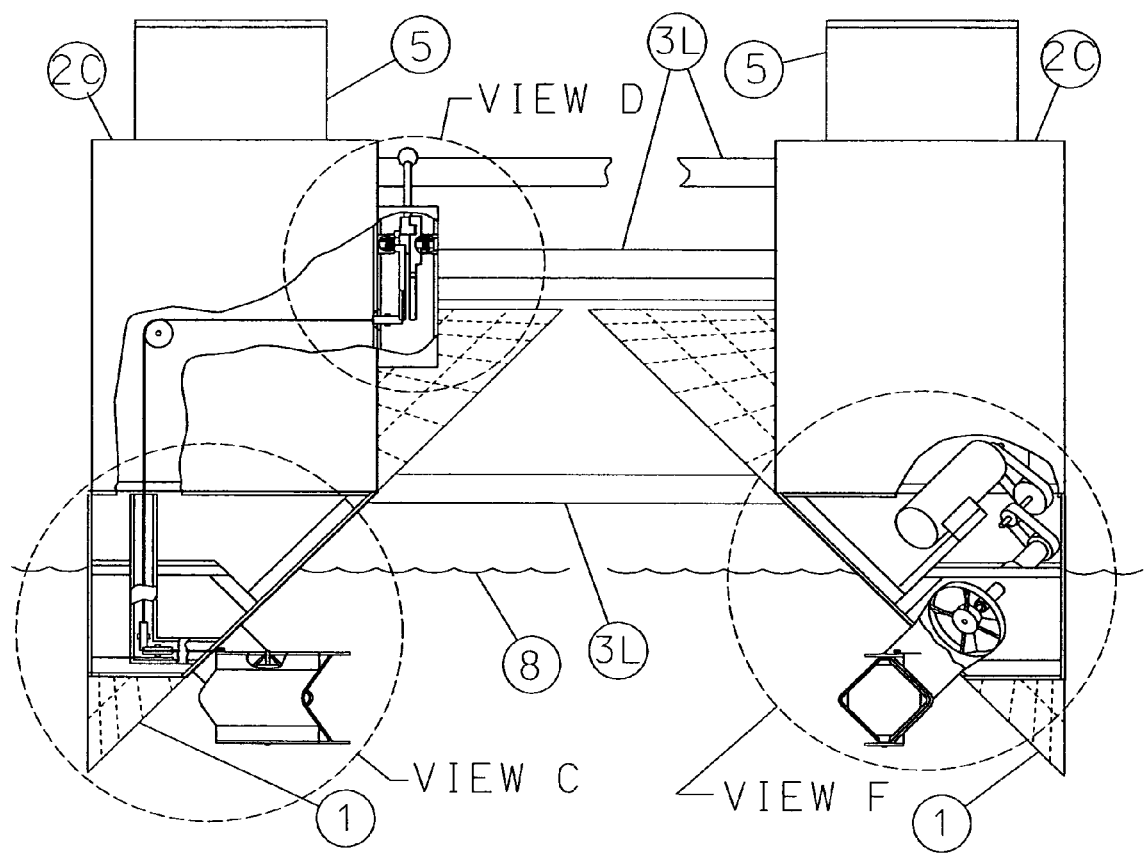
FIG. 11 is Section B-B of FIG. 2, showing the components of one of the water jets and its drive system and the components of one of the jet deflectors and its actuation system.

FIG. 11 is Section B-B of FIG. 2 in which the components of the water jet and the components of the jet deflectors are shown in three views. View F shows all the components of the right water jet plus the deflector at its outlet. View C shows the left water jet outlet, the deflector which has been actuated to achieve a right turn of the water craft, the cable that actuates the deflector and some of the pulleys that guide the cable to its destination. View D shows the hand operated components that actuate the cable.

Figure 12:
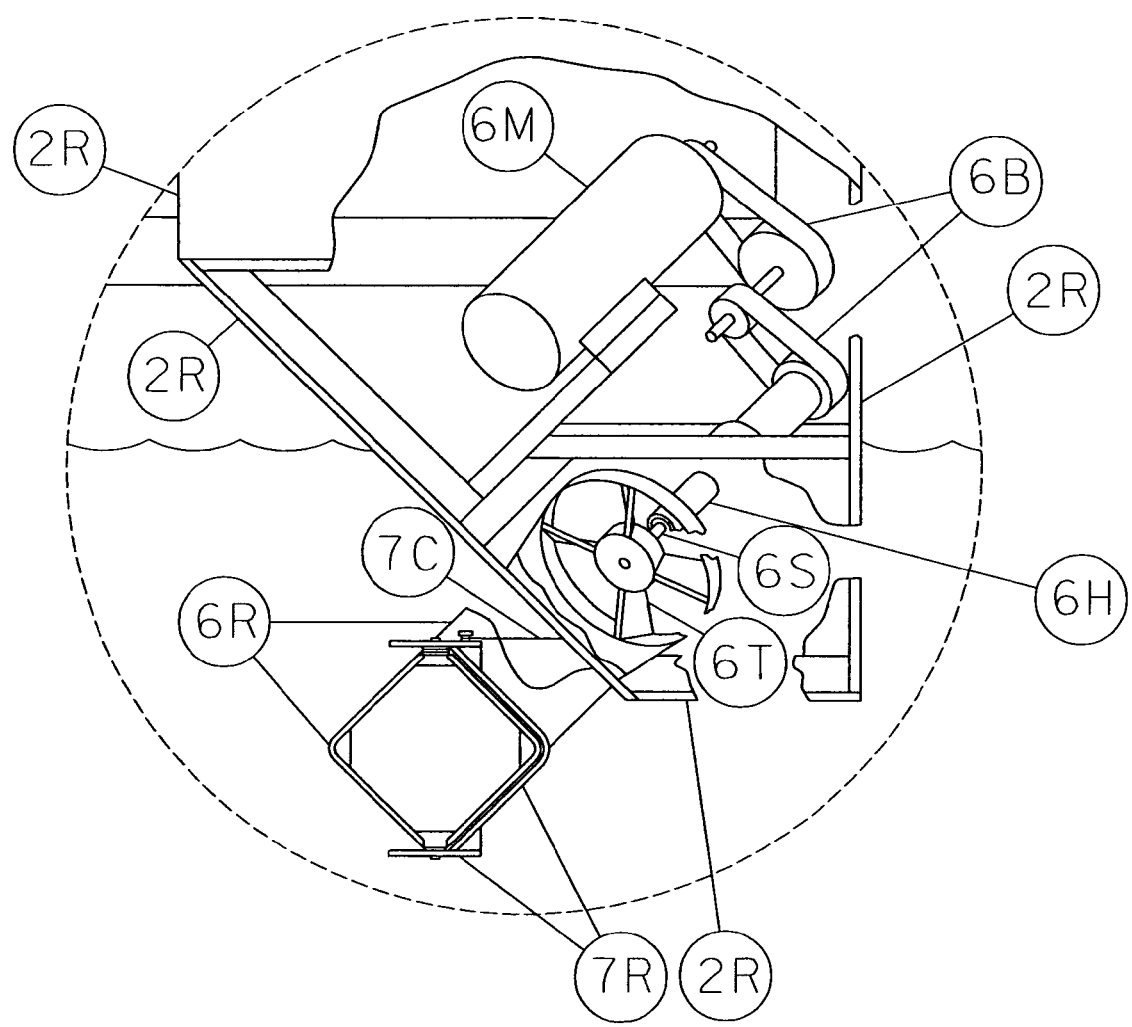
FIG. 12 is View F of FIG. 10, showing the water jet outlet with its deflector, the water turbine with its shaft and the electric motor with its belt drive.

FIG. 12 is View F of FIG. 11, showing the water jet outlet 6R coming out of the submerged part of the stationary hull 2R. 6R comes out through the slanted panel of 2R at an angle of 45 degrees with the longitudinal centerline the water craft. The water, after being accelerated by a turbine 6T, has only to turn 45 degrees in the outlet conduit to be discharged toward the rear of the water craft. The turbine's shaft 6S is supported by its housing 6H and is driven by an electric motor 6M through a belt and pulley system 6B. The water jet deflector 7R is shown in the neutral (none deflecting ) position ready to be actuated by cable 7C. Other items identified here have been described above.

Figure 13:
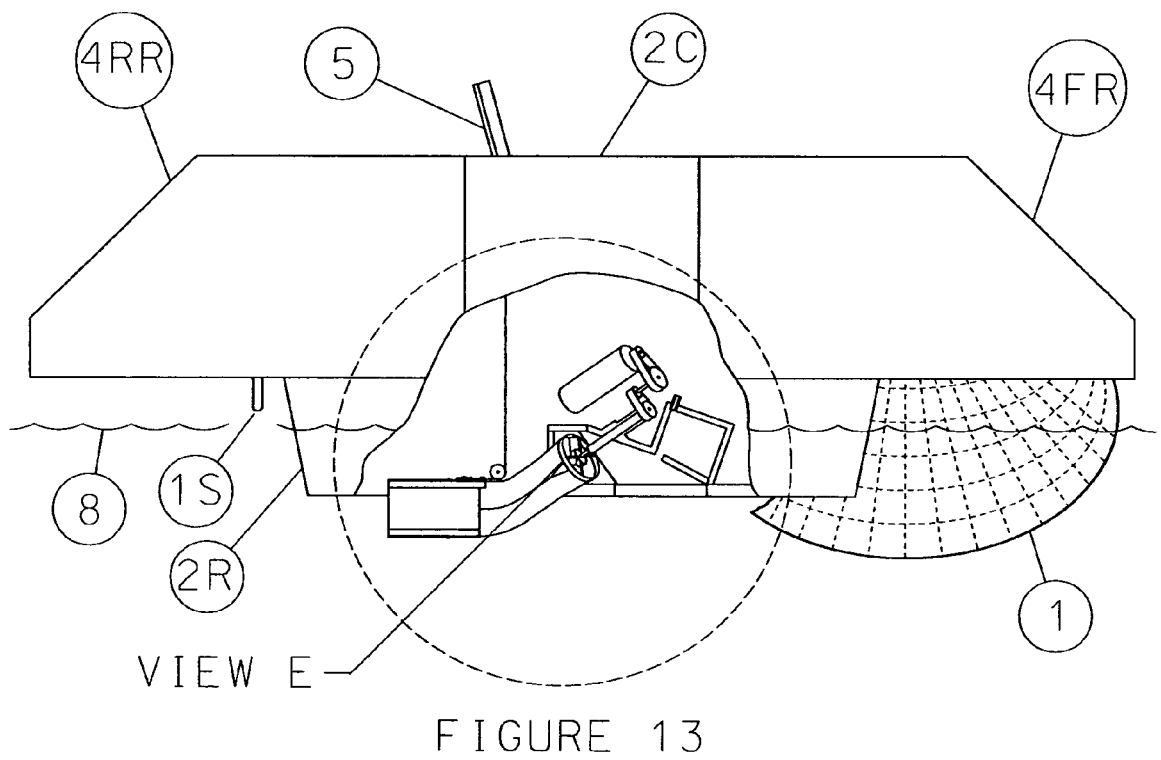
FIG. 13 is a modified side view of the water craft, showing the right water jet system.

FIG. 13 is a modified side view of the water craft with the rear right active hull removed and part of the right stationary hull cut out to show all the components of the water jet in View E below. Other items identified here have been described above.

Figure 14:
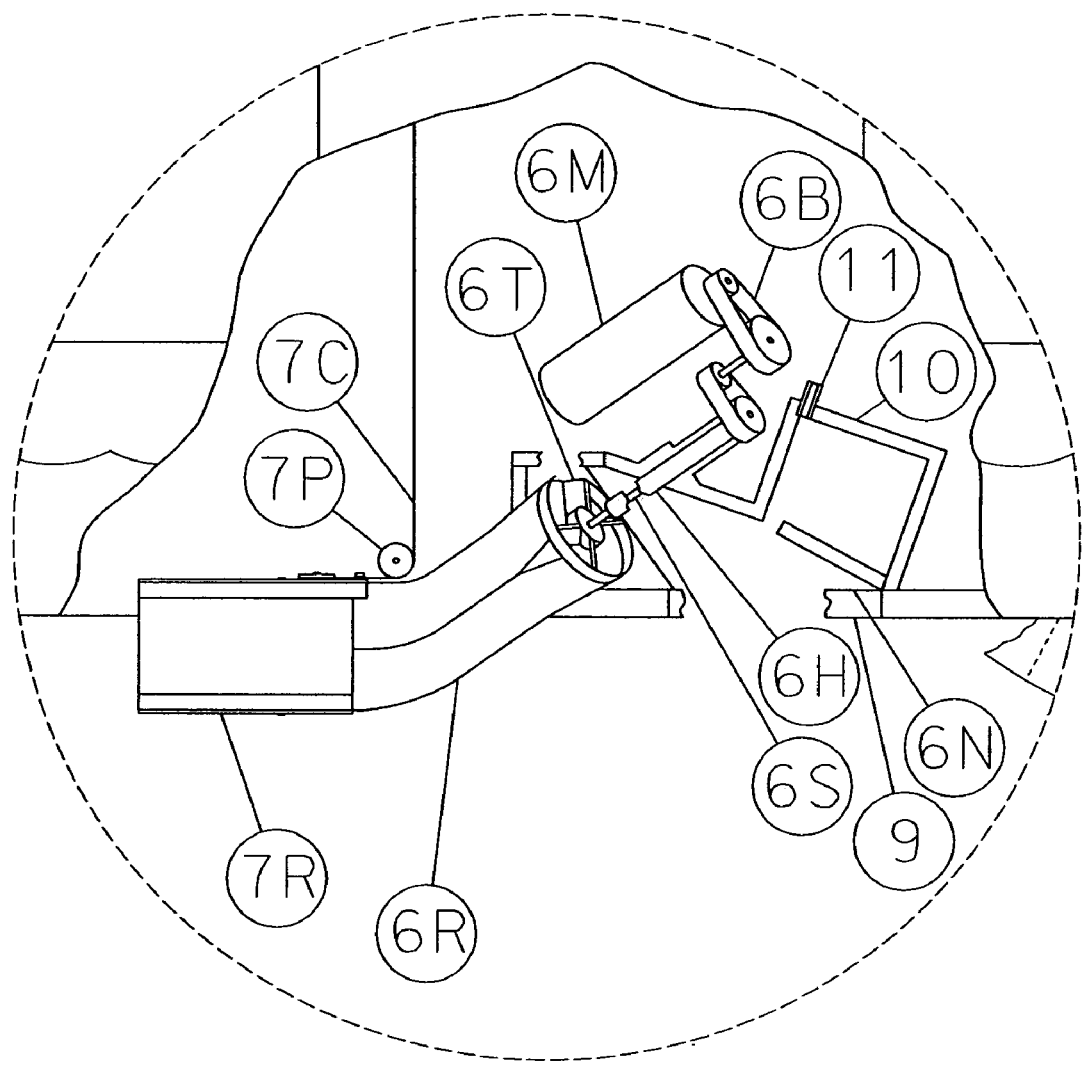
FIG. 14 is View E of FIG. 12, showing the right water jet system in details.

FIG. 14 is View E of FIG. 13, showing all the components of the water jet. Items that were not identified in FIG. 12 are water inlet 9 for the water jet, the inlet screen 6N, the surge chamber 10 and the air vent 11 that maintains the amount of water in the surge chamber to insure that the turbine is always immersed even with the rocking of the water craft. The right water jet deflector 7R is shown with its operating cable 7C and one of the pulleys 7P's that guides the cable to the operating handle(not shown).

Figure 15:
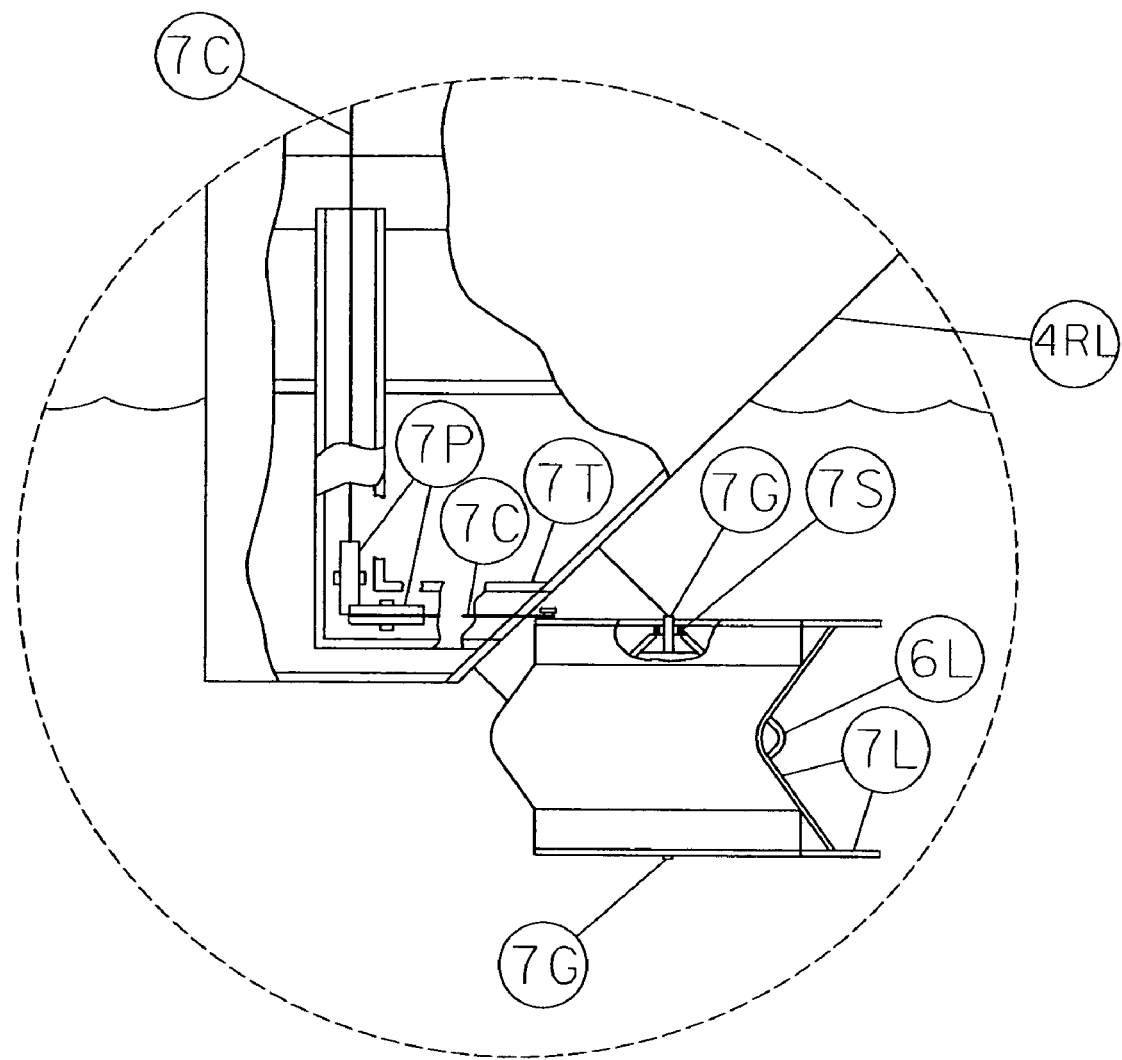
FIG. 15 is View C of FIG. 10, showing the water jet outlet, the deflector and the cable which eventually connects to the operating handle.

FIG. 15 is View C of FIG. 11, showing the left water jet deflector 7L attached to jet outlet 6L through the two guiding pins 7G's. The coil spring 7S helps 7L, which is in its fully deflecting position, to return to its neutral (non deflecting) position. The cable 7C which pulls the deflector is shown being guided by the two pulleys 7P's to a vertical position and will ultimately be guided by other pulleys to the operating handle(not shown). A water tight tubular housing 7T, for the cable and pulleys, is attached to the inside of the rear left stationary hull 4RL to prevent water from leaking into the stationary hull.

Figure 16:
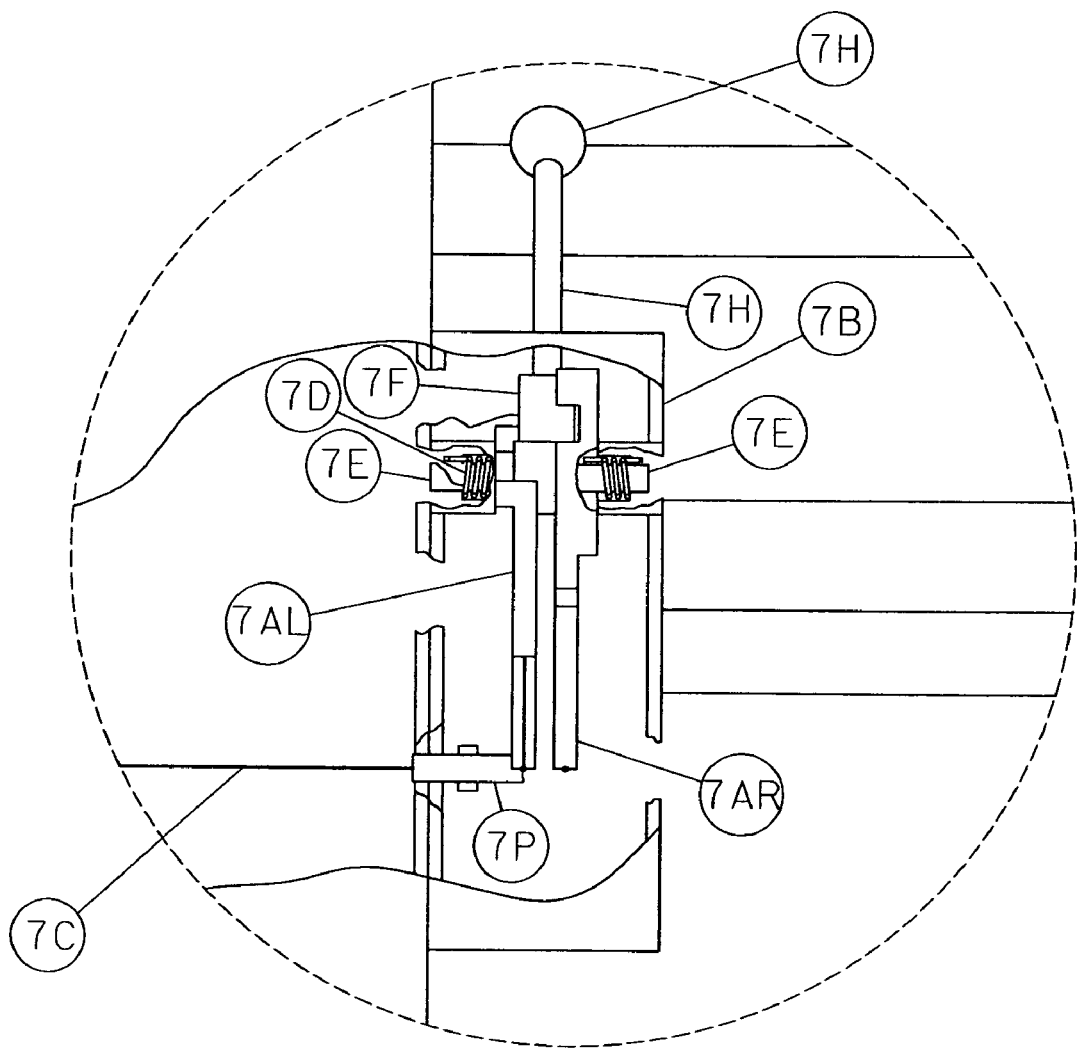
FIG. 16 is View D of FIG. 10, showing the deflector's cable drive and the handle that operates both the right and left jet deflector for the steering of the water craft.

FIG. 16 is View D of FIG. 11, showing the hand operated components that actuate cable 7C. The handle 7H is attached to an actuator 7F which selectively actuates either the left lever 7AL or the right lever 7AR. 7H, 7AL and 7AR are rotatable around the pin 7E, which is attached to the casing 7B. The two coil springs 7D's will return 7AL and 7AR to their respective neutral position. Cable 7C, which actuates the left deflector, is attached to the left lever 7AL after wrapping 90 degrees around pulley 7P. The cable that is attached to the right lever 7AR and the pulleys that guides the cable to the right deflector are not shown.

Figure 17:
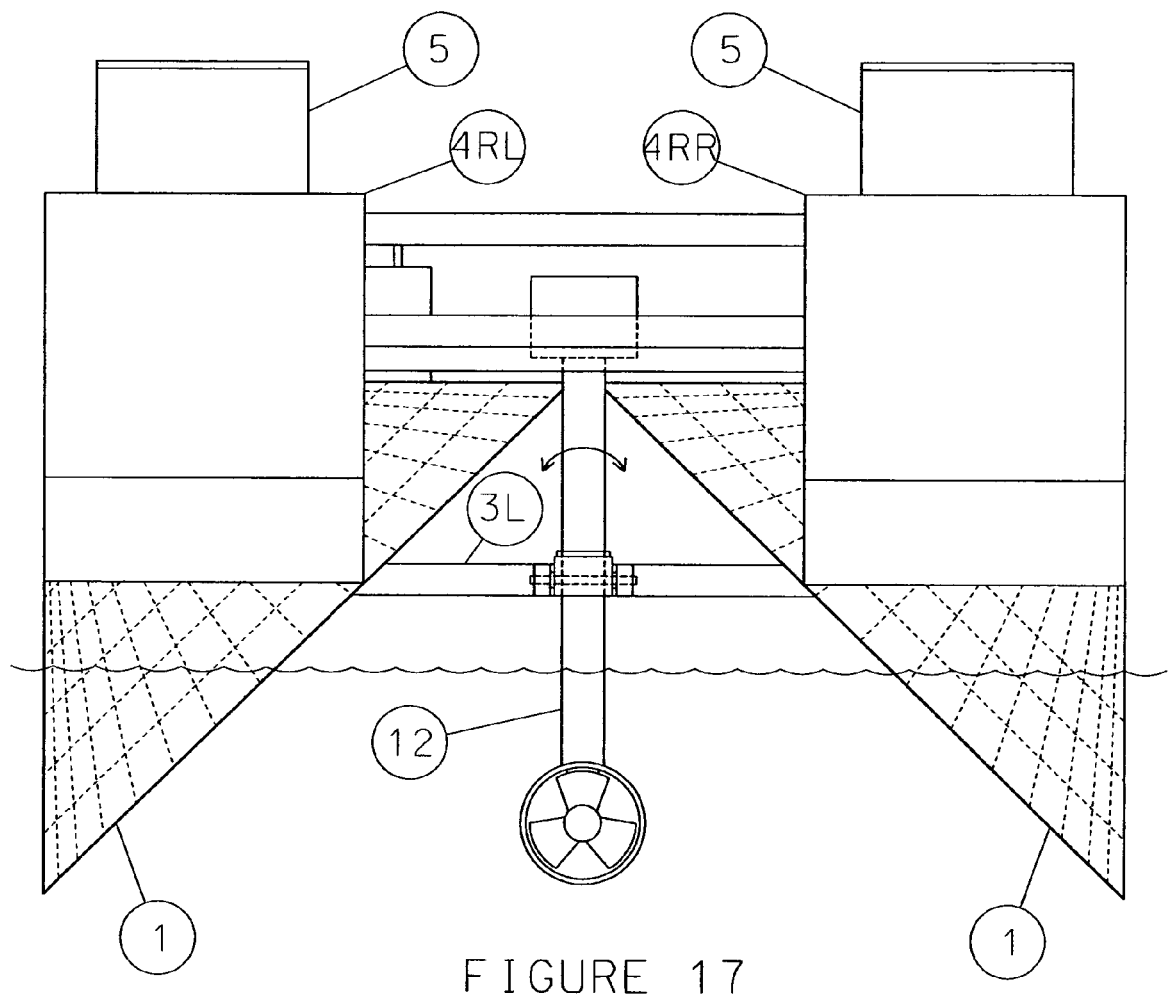
FIG. 17 is a rear view of the water craft equipped with an outboard motorized ducted propeller.

FIG. 17 is a rear view of the water craft with a different propulsive device. An outboard motorized ducted propeller 12 is attached to the supporting structure 3L. Other items identified here have been described before. More than one of the steerable propulsive device described in this figure can be used.

Figure 18:
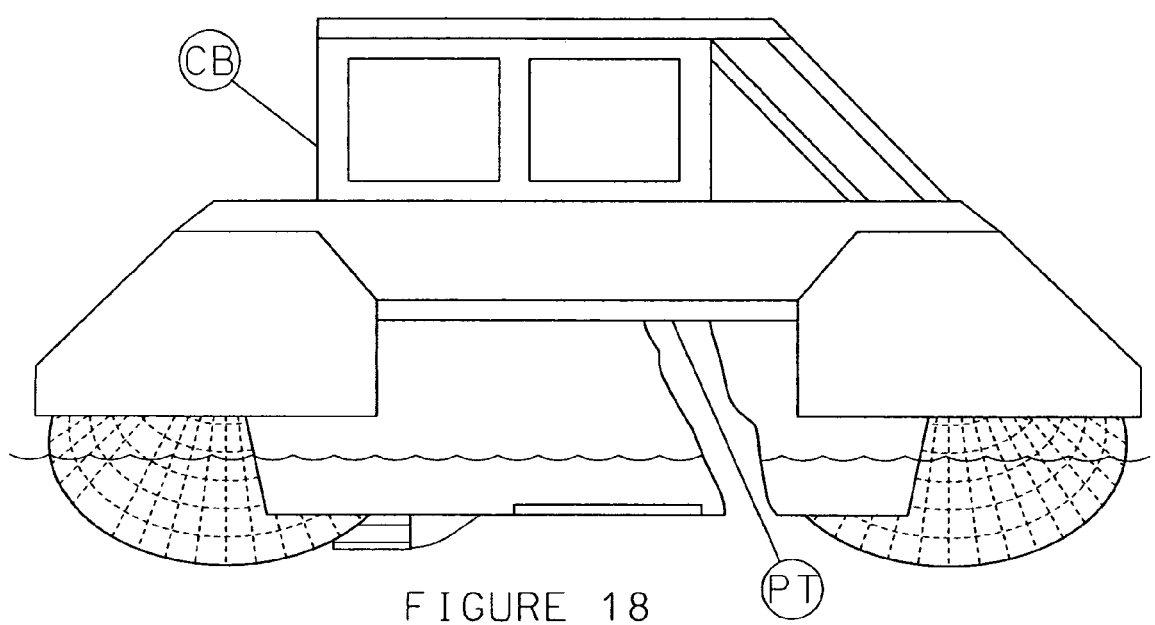
FIG. 18 is a side view of a water craft similar to the water craft described in figures above except that a platform is shown bridging over the two stationary hulls and that a cabin is erected above the platform.

FIG. 18 is a side view of a water craft that can accommodate a large number of riders. The larger water craft shown here is simply a scaled up version of the water craft described in the preceding figures except that a platform PT is added to bridge over the two stationary hulls and a cabin CB is erected on top of the platform.

Figure 19:
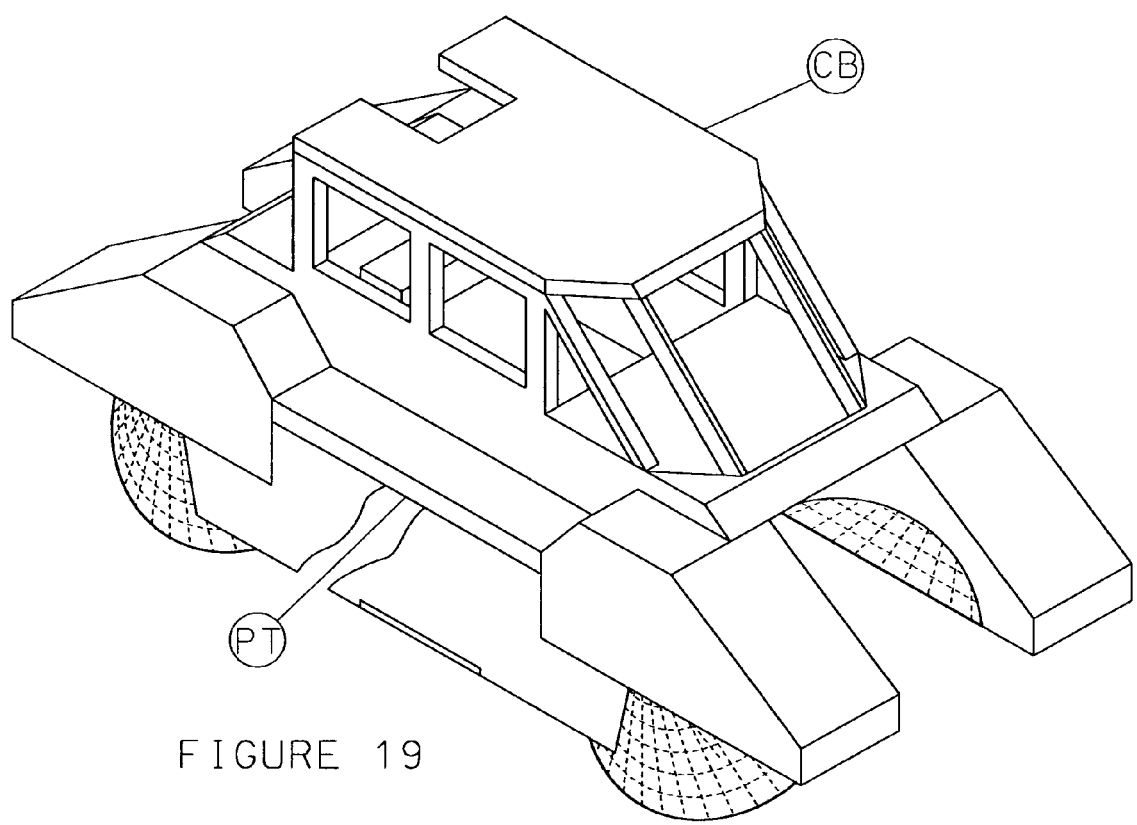
FIG. 19 is an isometric view of the water craft described in FIG. 18.

FIG. 19 is an isometric view of the water craft shown in FIG. 18.

Figure 20:
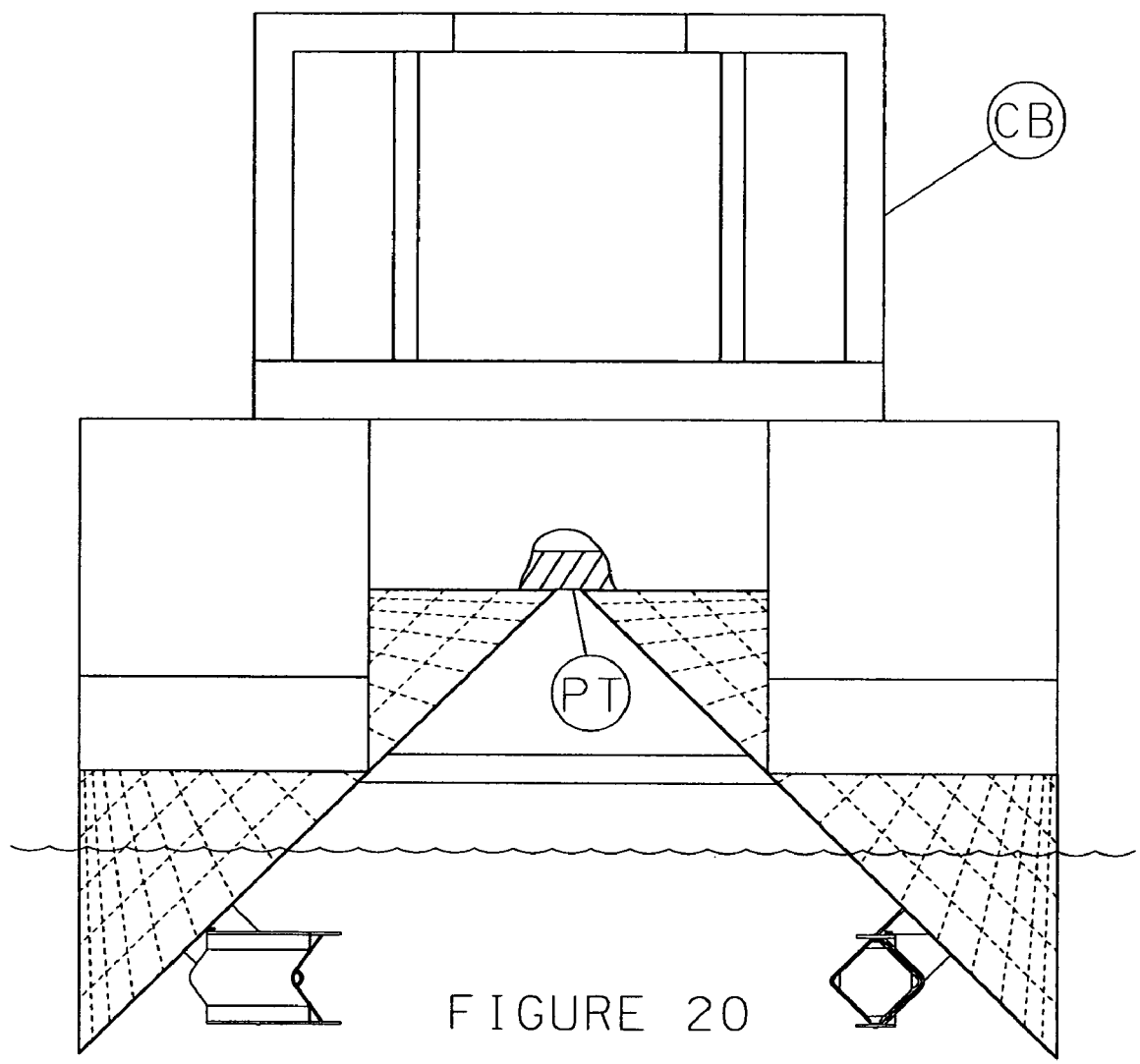
FIG. 20 is a rear view of the water craft described in FIG. 18.

FIG. 20 is a rear view of the water craft shown in FIG. 18.

Figure 21:
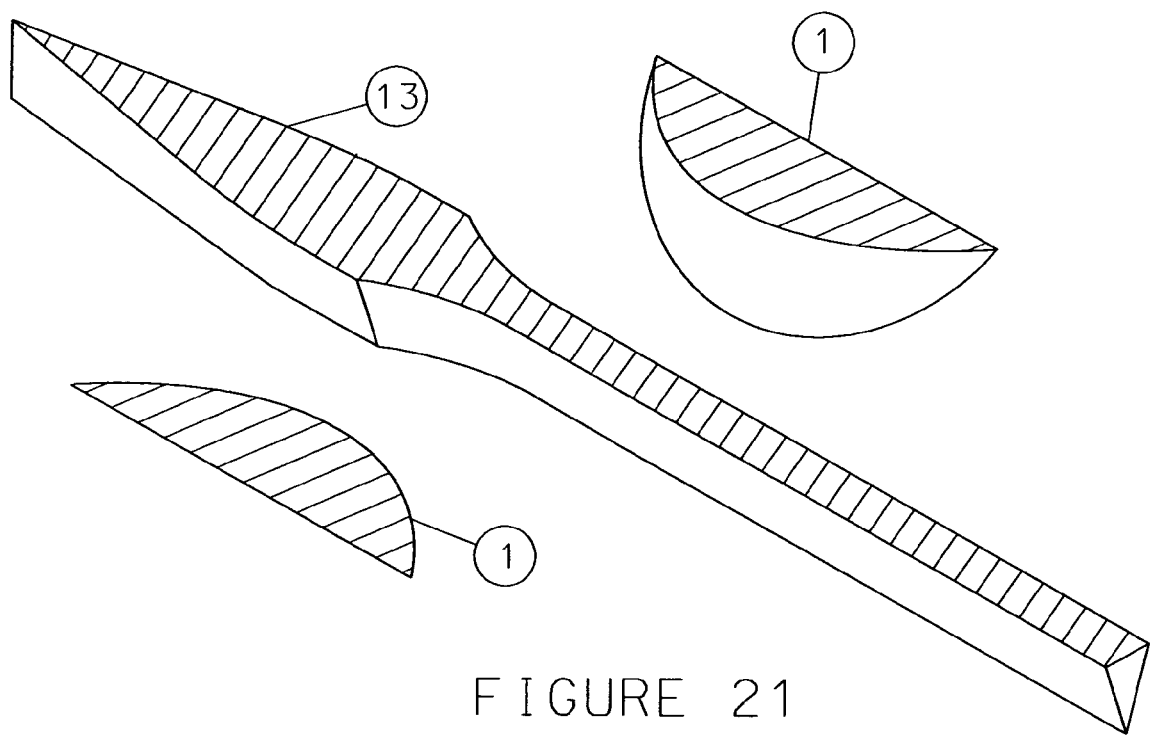
FIG. 21 is an isometric view of the immersed portion of the water craft in U.S. Pat. No. 6,595,815.

FIG. 21 is an isometric view of the water craft of U.S. Pat. No. 6,595,815, showing only the portion of the water craft under water. The shaded areas are the surfaces immediately below the water surface. The pair of rotatively driven active hulls is identified as 1 and the central stationary hull is identified as 13.

Figure 22:
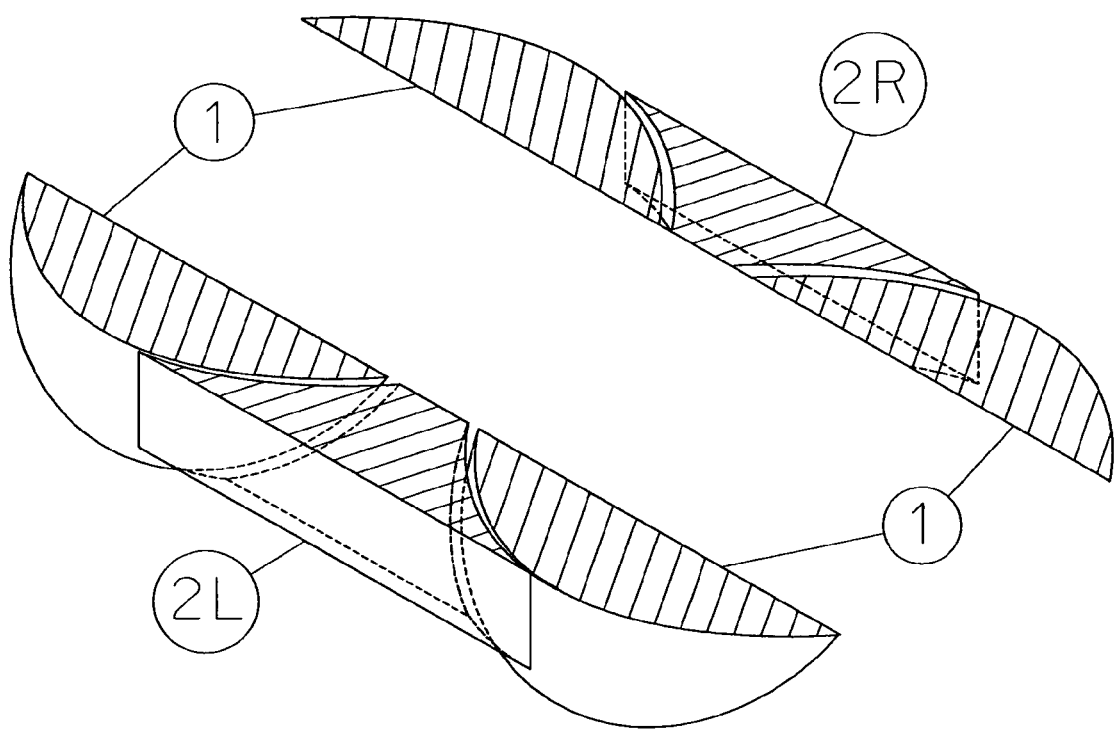
FIG. 22 is an isometric view of the immersed portion of the water craft in this invention.

FIG. 22 is an isometric view of the water craft of this invention, showing only the portion of the water craft under water. The shaded areas are the surfaces immediately below the water surface. The front pair of rotatively driven active hulls 1 here is similar to the pair of active hulls in FIG. 21. The central stationary hull in FIG. 21 is eliminated and is replaced by the pair of stationary hull 2R and 2L and the pair of rear active hulls 1. The figure here and FIG. 21 should help clarify the description of better performance of the water craft of this invention in the previous section: "BACKGROUND OF THE INVENTION".

I claim:

1. A watercraft comprising: two pairs of rotatively driven active hulls and one pair of stationary hulls in a longitudinal configuration with right and left symmetry that consists of a frontal pair of rotatively driven active hulls, each active hull having an axis of rotation positioned forty five degrees relative to the horizontal and projected laterally from the center line of the watercraft and each active hull being of a conical frustum design, with a planar end wall toward the said center line, a pair of stationary hulls longitudinally following the frontal pair of rotatively driven active hulls, each stationary hull having two longitudinal walls, one being a vertical wall which is the side wall located at the extreme lateral position of the pair of stationary hulls, the other being a slanted wall coplanar with the planar end wall of the active hull preceding, and each stationary hull having two lateral curved walls, the one in front being a curved surface that follows in proximity the curved surface of the rotatively driven active hull preceding, and the one in back being a curved surface that is symmetrical to the front one relative to the lateral center line of the stationary hull, and a rear pair of rotatively driven active hulls that is identical to the frontal pair.

2. A watercraft in accordance with daim 1, further comprising at least one additional pair of stationary hulls as described in claim 1 and at least one additional pair of rotatively driven active hulls as described in claim 1, with the requirement that said additional pair(s) of stationary hulls be sandwiched between two pairs of rotatively driven active hulls and that the watercraft ends with a pair of rotatively driven active hulls.

* * * * *